(12) United States Patent
Clouse

(10) Patent No.: US 10,810,619 B1
(45) Date of Patent: Oct. 20, 2020

(54) METHOD FOR INTERNET MARKETING

(76) Inventor: James William Clouse, Brentwood, TN (US)

(*) Notice: Subject to any disclaimer, the term of this patent is extended or adjusted under 35 U.S.C. 154(b) by 1710 days.

(21) Appl. No.: 11/974,568

(22) Filed: Oct. 15, 2007

(51) Int. Cl.
*G06Q 30/02* (2012.01)

(52) U.S. Cl.
CPC ..... *G06Q 30/0259* (2013.01); *G06Q 30/0261* (2013.01)

(58) Field of Classification Search
CPC ........... G06Q 30/0241; G06Q 30/0259; G06Q 30/0261
USPC ............................ 705/14, 14.4, 14.57, 14.58
See application file for complete search history.

(56) References Cited

U.S. PATENT DOCUMENTS

| | | | |
|---|---|---|---|
| 6,014,090 A | 1/2000 | Rosen et al. | |
| 6,563,513 B1 | 5/2003 | Yu et al. | |
| 6,628,307 B1 | 9/2003 | Fair | |
| 6,665,676 B2 | 12/2003 | Twig et al. | |
| 6,922,155 B1 | 7/2005 | Evans et al. | |
| 7,827,057 B1 * | 11/2010 | Walker ................. | G06Q 10/101 705/14.1 |
| 2002/0042819 A1 * | 4/2002 | Reichert et al. .............. | 709/217 |
| 2002/0055872 A1 | 5/2002 | LaBrie et al. | |
| 2004/0068362 A1 | 4/2004 | Mackawa et al. | |
| 2004/0110515 A1 | 6/2004 | Blumberg et al. | |
| 2004/0117246 A1 | 6/2004 | Applebaum | |
| 2004/0239703 A1 * | 12/2004 | Angelica ........................ | 345/962 |
| 2005/0027705 A1 * | 2/2005 | Sadri et al. ........................ | 707/5 |
| 2005/0183143 A1 * | 8/2005 | Anderholm et al. ........... | 726/22 |
| 2005/0251331 A1 * | 11/2005 | Kreft .......................... | G01C 3/08 701/438 |
| 2006/0026170 A1 | 2/2006 | Kreitler et al. | |
| 2006/0136090 A1 | 6/2006 | Koromyslov et al. | |
| 2006/0241859 A1 * | 10/2006 | Kimchi et al. ................. | 701/208 |
| 2006/0277477 A1 | 12/2006 | Christenson | |
| 2007/0001875 A1 | 1/2007 | Taylor | |
| 2007/0027925 A1 | 2/2007 | Spencer et al. | |
| 2007/0244900 A1 * | 10/2007 | Hopkins et al. ................ | 707/10 |
| 2008/0086356 A1 * | 4/2008 | Glassman .......... | G06Q 30/0242 705/14.41 |
| 2008/0140476 A1 * | 6/2008 | Anand ................... | G06Q 30/02 705/14.43 |

* cited by examiner

*Primary Examiner* — Mario C. Iosif
(74) *Attorney, Agent, or Firm* — Panovia Group LLP

(57) ABSTRACT

A method for providing Internet-based advertising for advertisers, and search functions for potential customers, introducing innovative search, display and advertiser access capabilities. These new innovations include a capability whereby a visitor may, by repeatedly zooming further in on a given geographic location, see more and more points of interest, corresponding to the chosen search criteria, but, not previously visible at smaller scales, and which may be displayed and queried for additional information. This system also provides to the advertiser, a means for changing any Dynamic Billboard in real time without intermediary action by any other party. It further provides an automated means to tabulate and report visitor activity.

20 Claims, 9 Drawing Sheets clikitysplit

A Visual Marketplace

69⟶  90⟶

| Name | | Phone Number 1 | |
| Address 1 | | Phone Number 2 | |
| Address 2 | | Fax Number | |
| City | | Mobile Number | |
| State | | Contact Name 1 | |
| Country | | Contact Name 2 | |
| Postal Code | | Contact E-mail | |

[Payment] [InActive] [Save]

Location    [Template] [Add New]

Search By  [City |V]   Criteria [        ]   [Search] [Refresh]

| Name | Address | City | Zip Code | County | State | Billboard | ☐ | Statistics | ☐ |
|---|---|---|---|---|---|---|---|---|---|
| ✎ | 5201 Maryland Way | Brentwood | 37027 | US | TN | Billboard | ☑ | Statistics | ☑ |

METHOD FOR INTERNET MARKETING

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of internet advertising and more specifically to a method for providing internet advertising.

Business advertising seeks to deliver information about businesses to potential customers in order to motivate them to patronize a particular business establishment being advertised.

Historically, advances in technology have always been quickly adapted to information dissemination means and adopted by advertisers. The internet and related advancements in computing and data processing and storage devices is the latest technology to be thusly exploited.

Typically, an internet advertiser may place an advertisement with an advertising provider to be found by a potential customer, or visitor, through use of a personal computer, or other device by which the internet may be accessed. For example PDAS or cellphones, may have browsers whereby the visitor may access web sites identified by search engines using relevant terms selected by and entered by the visitor.

As dictated by present technology, an advertiser may sign up with an internet presented advertising service for textual advertising of very limited scope. Such services may be presented over a geographic map format. This very limited presentation is static. That is to say it contains no video, graphics, photos, or other non-textual displays.

When a potential customer (visitor) enters relevant search terms into an advertiser search engine, he is presented with a first screen showing a group of the aforementioned limited scope advertisements. These paid advertisements are usually displayed in a box labeled "Sponsored Listings," or the equivalent. Also, a map might be displayed with icons superimposed on the map showing the locations of the businesses listed in the sponsored listings box. The sponsored listings box is physically limited in capacity. If the potential customer wishes to see more results, he must click through to another screen containing more advertisements and another map showing locations only for those businesses displayed in the sponsored listings box. Thus, due to space limitations, in order to see all results, the potential customer must click through to numerous different screens. Further, if a potential customer wishes more detailed information about a particular business, he must click on the title line of the three line advertisement or the icon on the map to cause a landing screen or other conversion path initiation screen to be displayed.

Now, those skilled in the art will readily appreciate that it would be advantageous to an internet advertiser to have his advertisement displayed at the top or as nearly as possible to the top of the first screen of results presented to the visitor. As a matter of common practice, such position may be obtained only by payment of a premium or by outbidding other advertisers.

In contrast to the above, the internet advertising method of the instant art can display all results on the first displayed search results screen, and does not limit quantity of content, nor does it limit said content to text. It requires no clicking-through to multiple limited content screens, and requires no clicking through to landing screens or other conversion paths in order to reach detailed advertising presentations. Instead, it displays Dynamic Billboards in response to a visitor mousing over trigger points. That is to say, the visitor moves a cursor so that it contacts an icon on the first Screen, and in response, a detailed in-depth display is presented. Further, the instant art provides an internet advertisement that an advertiser can easily access and change in real time without intermediary action of or approval by the media provider and which can position the advertiser position on the first screen of search results in accordance with geographic reference instead of for paying a premium or out bidding other advertisers. In these innovations, the technology taught herein significantly advances the art.

Additionally, this technology provides further innovation by creating and incorporating a geographic zoom function that, as scale is increased permits points of interest, not previously displayed to be viewed and accessed by the visitor. This function not only increases the scale, but innovatively injects greater and greater advertising detail along with scale size, thereby permitting greatly increased information availability within a fixed screen size.

To put this another way, this innovation introduces an intuitive drill-down information search and display capability in graphic form whereby generated tabular data clusters may be opened, graphically displayed, graphically de-clustered, examined and repeatedly, further graphically de-clustered for increasingly detailed examination. Employment of this capability is to be intuitive in that it resembles a mere zoom-in graphics function.

Tabular information clusters resulting from each visitor's data search are converted to geographic representations and so incorporated as to allow "drill down" displays, showing search results in increasing detail as the user drills deeper in the graphics by intuitively zooming in on the picture.

OBJECTS OF THE INVENTION

An object of the invention is to introduce an intuitive drill-down information search and display capability in graphic form whereby generated data clusters may be opened, graphically displayed, de-clustered, examined and repeatedly, further graphically de-clustered for increasingly detailed examination. Employment of this capability is intuitive in that it resembles a mere zoom-in graphics function.

A further object of this invention is to introduce an innovation wherein tabular information clusters resulting from a data search are converted to geographic representations and so incorporated as to allow intuitive "drill down" displays, showing search results in increasing detail as the user drills deeper in the graphics.

An object of the invention is to present internet advertising in a limited space without commensurately restricting the volume of information that can be presented.

Another object of the invention is to present internet advertising in a limited space that is not restricted to textual messages but allows full integration of graphics, video, audio, and other information delivery and/or presentation means.

Another object of the invention is to greatly expand the number of results that may be displayed on one screen, thusly enabling a potential customer to avoid clicking through a multitude of screens to discover all results.

An additional object of the invention is to permit an advertiser to have dynamic web presence without the advertiser actually possessing a domain or website.

A further object of the invention is to provide a vehicle via which an internet advertiser may change his advertisement in real time quickly.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a method for providing internet advertising comprising the steps of:

presenting to the customer means to initiate an internet search for points of interest to said customer within a geographic area chosen by said customer, simultaneously displaying all search results as icons superimposed on a map of the geographic area such that each icon represents a particular point of interest and each icon depicts on the map the geographical location of the particular point of interest which it represents, presenting to the customer a Dynamic Billboard display screen comprising data relevant to the particular point of interest represented by the icon when the customer mouses over the icon, said dynamic display screen comprising one of several options of the plurality of Dynamic Billboards comprising text, video, graphics, or clickable links to web screens or sites concurrently, alternatively, or singularly, and presenting to the advertiser means to change any Dynamic Billboard in real time without intermediary action by any other party or entity.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 6 depicts a customer service section display in detail.

FIG. 7 depicts a customer information screen.

LIST OF COMPONENTS

Figure 1:
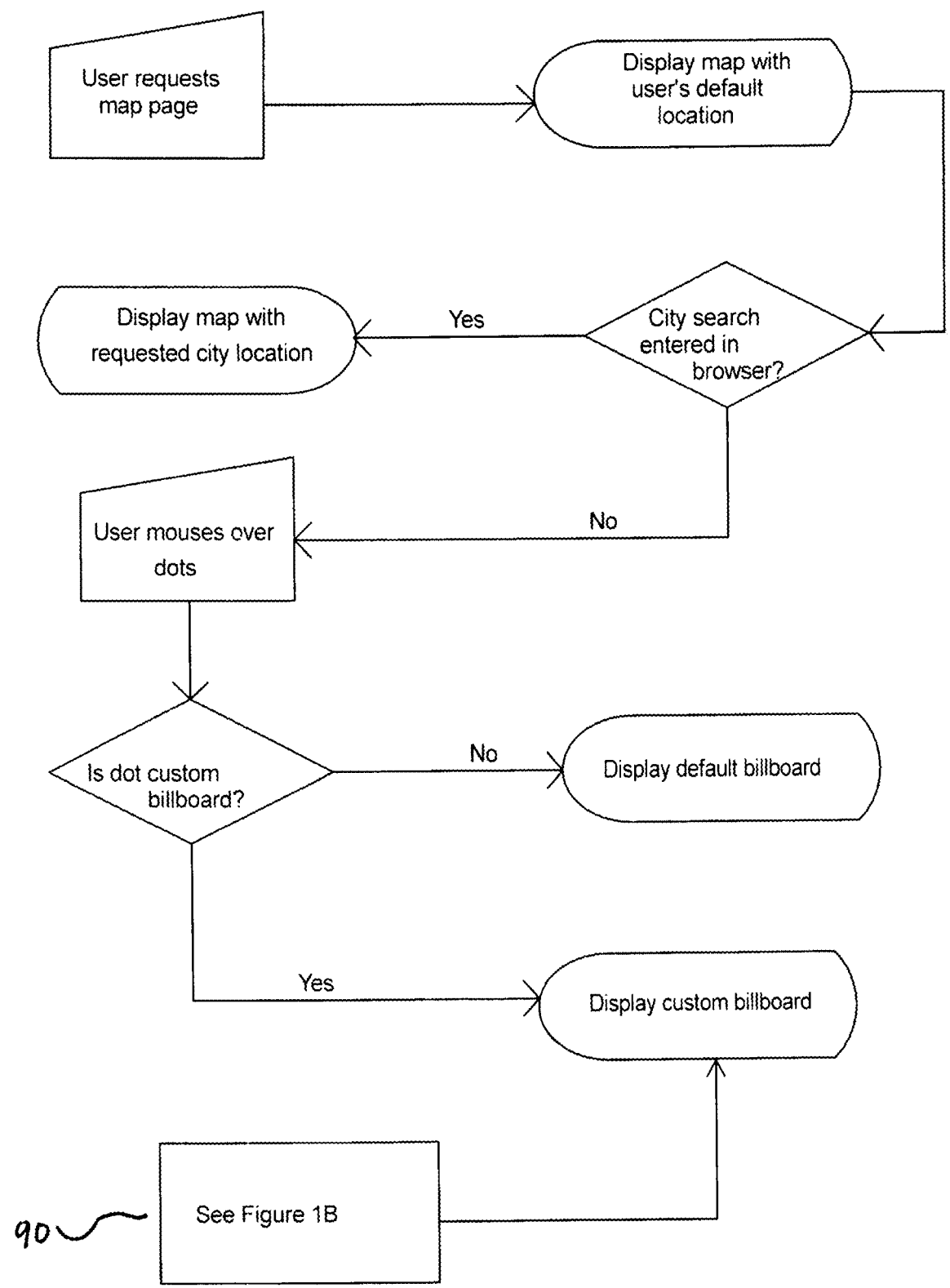
FIGS. 1 and 1B, continuous constitute a flow chart depicting steps comprising the instant method.
Figure 1B:
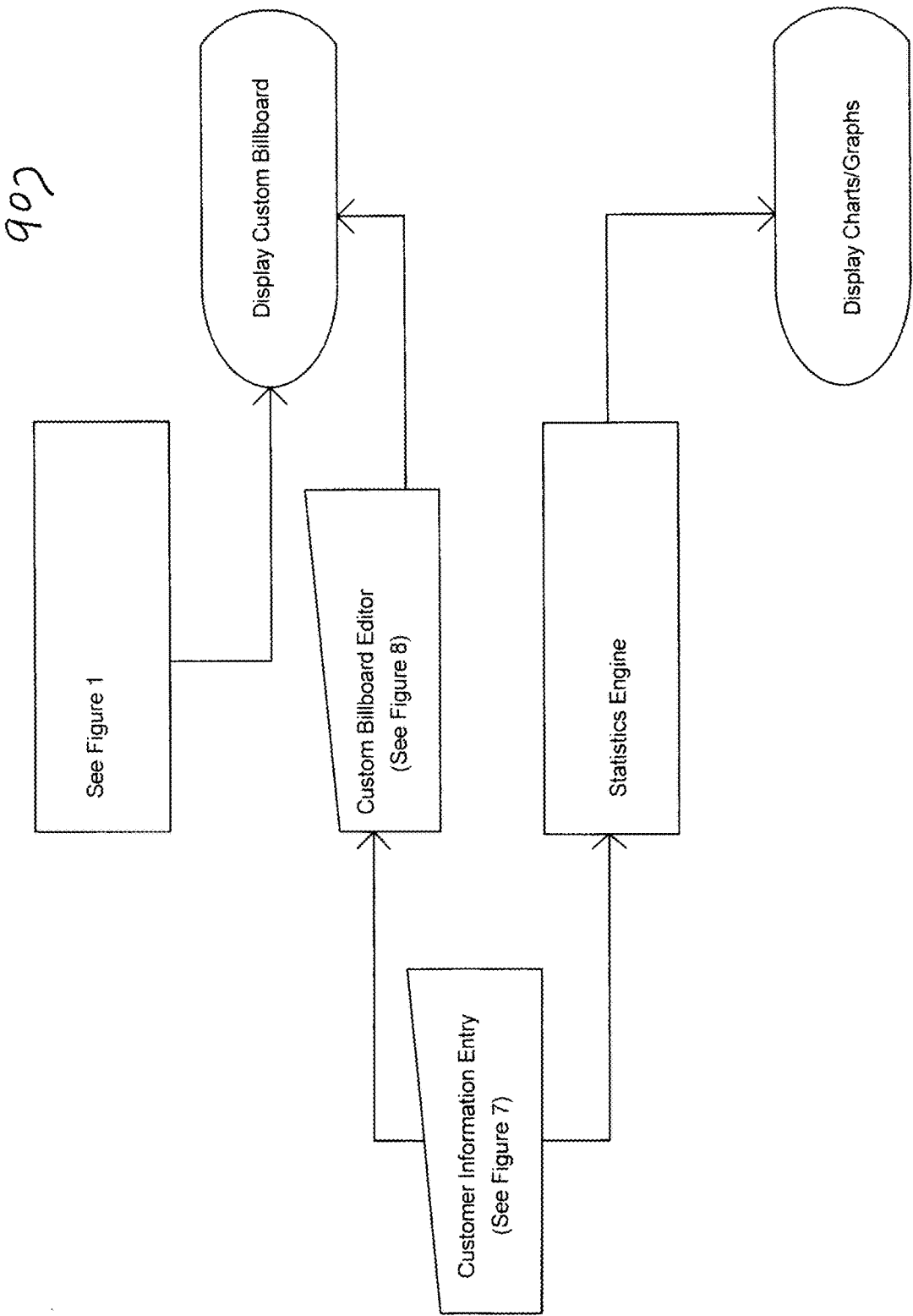

15 Browser home page
18 Category selection drop down box
25 Default mouse-over information-box pop-up for non-subscribing advertiser
28 Box inviting visitor to use instant art
30 Map page showing mouse-over Dynamic Billboard of subscribing advertiser
38 Relevant search location entry box
40 Search activation button
42 First instant art search results
45 Map
46 Map page showing mouse-over visual display of non-subscribing advertiser (Default non-subscriber information-box pop-up display)
47 Point of interest icon representing a subscribing advertiser
49 Function means activation buttons
52 Dynamic Billboard screen
55 Dynamic Billboard
69 Secure customer access web-page
74 Clickable line of text (hyperlink)
82 Service offer box
84 Service offer box clickable element
88 Point of interest clickable element
90 Customer service pages
100 AJAX Components
110 XHTML Components
120 Map Control
130 Tile Business Objects
140 Left Panel Bar
150 Right Panel Bar
160 Map Server
170 Geographic Data Store
180 Web Server
190 Location Business Data Store
200 Location Data Store
210 Billboard Business Objects
220 Customer Data Store
230 Customer Business Objects Brief Summary of the Invention in a Selected Mode, Initiation of Method In practical application, this method is initialized when a visitor (visitor shopper or potential customer) visits the methods associated homepage. The method software determines the visitor's reference location by means of the IP address, cell phone location, or other automated or manual input, and displays a map centered on that location.

Figure 2:
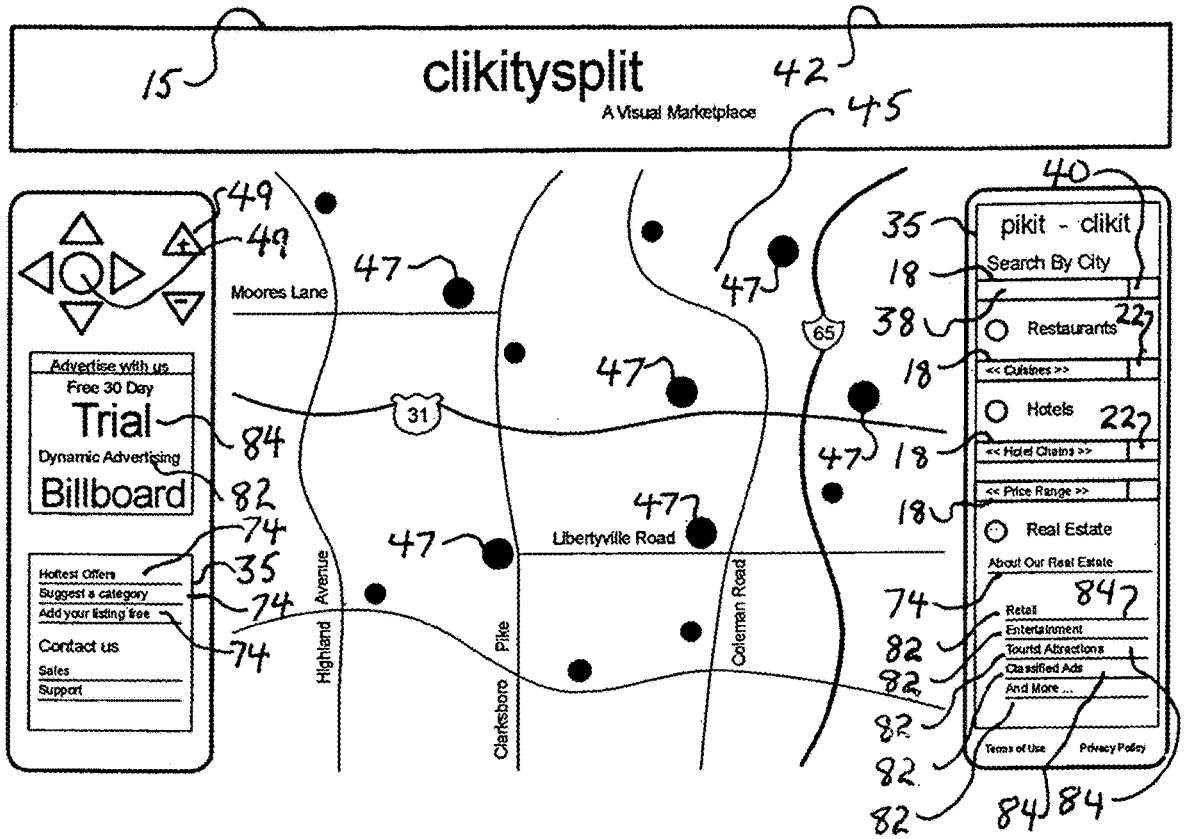
FIGS. 2 through 5 show consecutive screens illustrating samples of displays to be observed as the visitor progresses through the site.

Referring further to FIG. 2, this map covers essentially the entire display screen. Various colored dots representing different types of visual displays or pop-ups, available for selection, appear on the map in accordance with the reference location used. (47 denotes a few of these.) When the visitor mouses over any given colored dot, a new visual display will appear. If the point is assigned to a subscribing advertiser, the visual display will contain active controls and displays (termed a Dynamic Billboard). Clicking on a link on the Dynamic Billboard will take the visitor to that given advertiser's expanded display or website to receive more information, make reservations, or perform other interactive activities. If the point is not assigned to a subscribing advertiser, a static information-box pop-up (25) appears.

The homepage also displays left panel bar (140) offering a video describing how to use the site, promotional information for the site, methods of contacting the sponsoring or managing organization, and options for visitor reviews, and a right panel bar (150) via which the visitor may enter one or more search terms, or may select from various pre listed categories, such as: restaurants, hotels, retail, entertainment, tourist, real estate, classified ads, etc. These panel bars are constructed using AJAX technology. (Asynchronous JavaScript and Extensible Mark-up Language.) (See FIG. 8, item 100.) Upon selection of a search category, a drop down menu may appear with increasingly specific sub-categories. Thus, search results can be accomplished via point-and-click alone with no textual entries required.

The right panel bar (150) also overlays the map, and carries paid advertising, including audio and motion picture or video presentations.

Brief Summary of the Invention in a Selected Mode, Map Control

Figure 8:
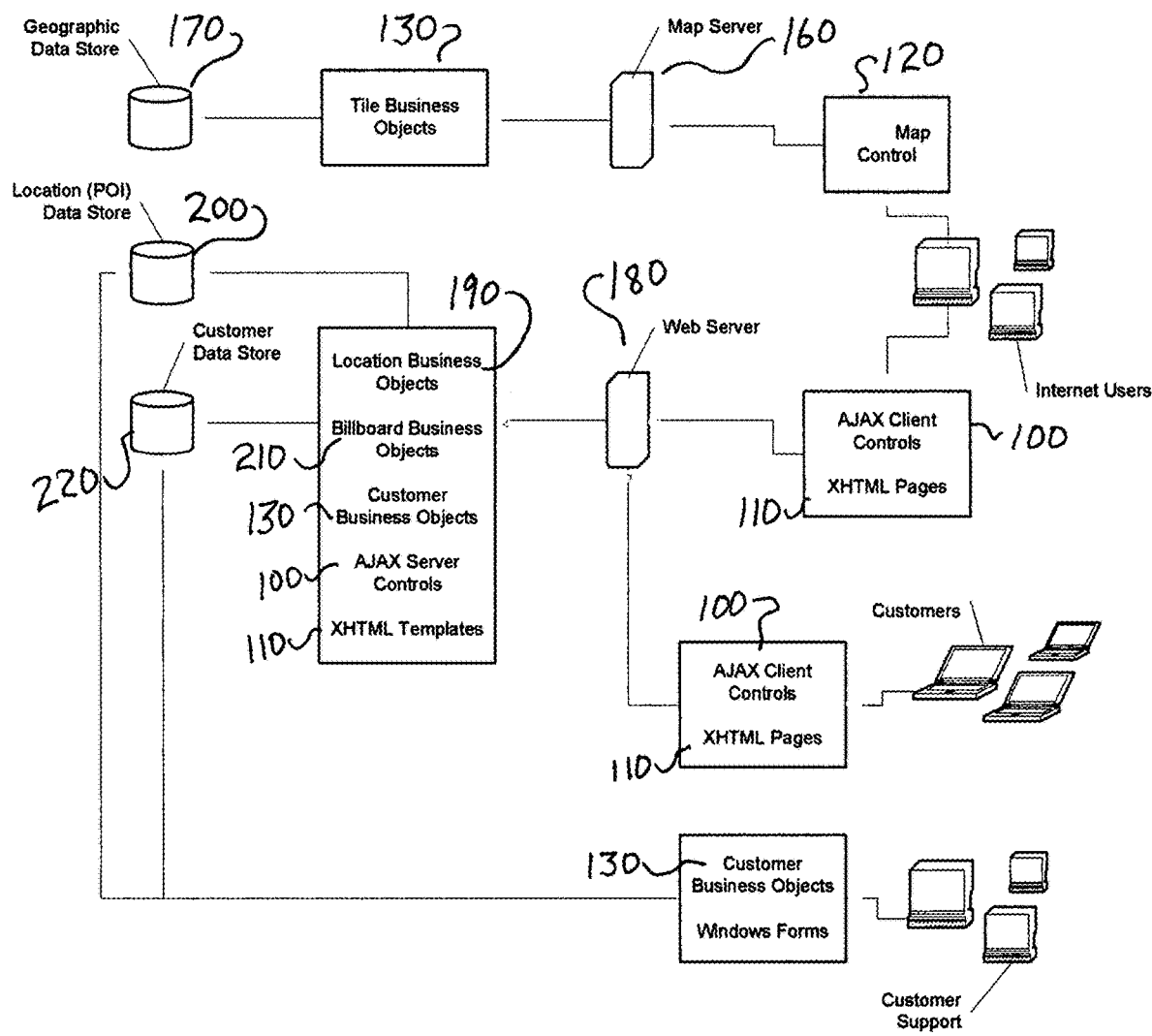
FIG. 8 depicts a Dynamic Billboard editor.

Continuing with FIG. 8, a map view is created and defined as the geographic area contained within the borders of the browser of the Map Control (120). The rendered map of any particular geographical area is comprised of two basic parts:

1. The map background comprising small square pieces called geographic tiles. (See item 130, Tile Business Objects.) These are sent from a Map Server (160) and rendered in the browser as small divisions of the overall map displayed. This procedure of using small tiles to make up an entire map is used to provide smoothness during panning and zooming in the map view.

2. The map overlay, comprising small images (dots) with associated GPS (Global Positioning System) coordinates, also called "pushpins." (See FIG. 2, item 47.) These pushpins, overlaying the map, indicate positions and locations of various points of interest (abbreviated"POI.").

Brief Summary of the Invention in a Selected Mode, Building the Map

During a visitor's "user session," the POI are assembled for a rendered map, as requested by that given visitor, as part of that visitor's "user session" as follows. Referring to FIG. 8, item 110, when a visitor accesses the associated home page for a system employing this method, an associated Web Server (180) sends an XHTML™ (Extensible Hypertext-Markup Language) page with an embedded Client Map Control (120). The Map Control (120) is set to display the user's location based on the incoming IP address of the requesting browser. (Other locating information, such as cell phone GPS locator data, or manually inputted data may also be used for this purpose.)

The Map Control (120) is provided by the Web Server (180), but it communicates directly with the Map Server (160). As soon as the Map Control (120) is initiated in the browser, an instruction is present that instructs the Map Control (120) to request a visitor/user's location map view, which it retrieves from the Map Server (160). The Map Server (160) queries a Geographic Data Store (170) to retrieve the proper tiles necessary to compose the requested map view.

Once the location map view is returned from the Map Server (160), the Map Control (120) sends a request to the Web Server (180) for POI. This request includes the geographic coordinate boundaries of the map view. Based on the geographic coordinates requested by the client Map Control (120), the Web Server's (180) business logic, the Location Business Objects (19) queries data tables in the Location Data Store (200) for all POI within the map view boundaries.

The POI for each individual location contains basic information to construct a default information-box pop-up. (See FIG. 3, item 25.) This default information-box pop-up contains the name, address, city, state, and telephone number of the POI location. At this point, a Web Server session holds all of the basic POI location data for the user's map view.

Brief Summary of the Invention in a Selected Mode, Rendering the Map

Referring to FIG. 8, it is a function of the Web Server's (180) Location Business Objects (190) to inspect the location data and determine if any of the individual locations are associated with a subscribing advertiser. Specifically, the Location Business Objects (190) query a visual display type field in the Location Data Store (200), to determine if a location is associated with a subscribing advertiser. If an association is identified, the Location Business Objects (190) substitute alternate request data for that location in place of a default information box popup request, based on a selection of different enhanced Dynamic Billboard configurations that may be specified by a subscribing advertiser. The default location data information, now combined with requests for locations containing enhanced Dynamic Billboards, is sent to the user's browser for overlaying onto the map view. (See FIG. 3, item 30.)

Brief Summary of the Invention in a Selected Mode, Using the Map

When a user mouses over a pushpin on the map, Client Map Control (120) requests the display associated with that location. If the location contains a non subscribing advertiser's default data, a request is made for a default info-box popup.

When a location contains a data request for an enhanced Dynamic Billboard, the Billboard Business Objects (210) respond to an incoming request for an enhanced Dynamic Billboard by querying data from the Customer Data Store (220). This data is combined with XHTML™ Templates, to create Dynamic Billboard formats, as dictated by the type of enhanced Dynamic Billboard requested. The Billboard Business Objects (210) construct the requested billboard dynamically on-the-fly from data in the Customer Data Store (220) and the associated XHTML™ Template.

The XHTML™ Template provides the base structural XHTML™ browser markup for the Dynamic Billboard, while the information from the Customer Data Store (220) provides the textual, image and audio/visual content. Text formatting is provided as part of the base XHTML™ structure through the use of CSS (Cascading Style Sheets) so that when plain database text is combined with the XHTML™ Template, the text is automatically formatted.

The Dynamic Billboards of subscribing advertisers are composed of one or more XHTML™ Template, which provide the basic structural and text formatting information: (b) plain text in paragraph format: (c) image file URL addresses; and (d) URL addresses of audio/video files. The plain text content and the URL addresses of the other files are contained in the Customer Data Store (220).

The text is inserted between sets of XHTML™ markup tags in a template designed for that purpose. The image URL addresses are HTTP addresses of image files that reside in the Web Server's (180) file system, and will be requested b the browser as the display is rendered. The audio/video URL addresses are also the HTTP addresses of files stored within the Web Server's (180) file system.

The net result is a complete XHTML™ Web page that is sent to the client browser and appears within the area of the info-box popup.

Brief Summary of the Invention in a Selected Mode, Customer Interface

The necessary plain text, image, and media address information is generated through the Customer Web Interface, which provides private access to the Web Server (180) for the subscribing advertiser/customer through a secure Web Page. The Customer Business Objects (230) connect to client Web Controls on the Customer Web Page that accept information from the customer and store it in the Customer Data Store (220), for both accounting purposes and for use in building Dynamic Billboards.

The customer gains access by logging on to a secure Web Page, which displays appropriate Web Controls for entering the customer's billing information, and selecting which Dynamic Billboards are to be associated with which customer locations.

The customer moves to a second secure Web Page, which displays the appropriate Web Controls for entering the plain text information for the Dynamic Billboard. Each Web Control provides access to one item or paragraph of plain text information for display in the Dynamic Billboard. The number of paragraphs allowed is based on which XHTML™ Template the customer has chosen.

Other Web Controls allow the customer to upload to the Web Server (180) the image or images to be associated with the Dynamic Billboard. Some Dynamic Billboards have additional Web Controls to upload audio and/or video files that will also appear in the Dynamic Billboard when requested by the browser.

The information entered at a Customer Interface updates the Dynamic Billboard in real time. The customer's edited information is reflected immediately in the associated Dynamic Billboard, ("on-the-fly"). A mobile interface is also provided to enable the customer to edit Dynamic Billboards from a wireless PDA or web-enabled cell phone.

Brief Summary of the Invention in a Selected Mode, Customer Statistics

A second interface to the customer and Location Data Store (200)*s* is provided by a Windows® Forms application that runs on any computer that can run a modern Windows® operating system. This interface is used in-house by the customer support staff.

Because the instant art employs a three tier design which uses business classes to abstract the data from various databases involved and presents that data in the form of various business objects, the Windows (8) Forms application is able to employ the same Customer Business Objects (230) used on the Web Server (180), within its stand-alone applications, thus providing the same screens as the Web Customer Interface. Additional screens are provided for accounting use, and for administration and maintenance of the Customer and Location Data Stores (200).

Brief Summary of the Invention in a Selected Mode, Utility Maintenance Tools

POI data is provided for this system is several diverse formats. Two utility tools are employed to transfer the data from various formats into the RDN (Relational Database) Format used by this system. POIXmlImport™ is a utility tool created for this technology that imports XML data, converts it to Relational Database Format and uploads the data to the Location Data Store (200). POICsvImport™ is another utility tool created for this technology that performs a similar function on Comma Separated Value (spreadsheet) data.

Embodiments of the Invention

In one aspect, the invention is a method for providing internet-based advertising for one or more advertisers to one or more customers comprising the steps of presenting to each customer means to initiate an internet search for geographically located points that are of interest to said customer, said search being centered within a geographic area automatically chosen for, or manually selected by, said customer; simultaneously displaying results of the said search as icons superimposed on a map of the geographic area such that each icon represents a particular point of interest, and each icon depicts on the map the geographical location of the particular point of interest; presenting to the customer a Dynamic Billboard display window comprising data relevant to the particular point of interest represented by the icon when the customer mouses over or otherwise designates the icon, said dynamic display window comprising one of several optional Dynamic Billboards comprising text, video, graphics, or clickable links to web pages or sites concurrently, or alternatively; and presenting to the advertiser means to change any Dynamic Billboard or said windows in real time without intermediary action of or approval of any other party or entity.

In another aspect, a means is provided by which the map display scale may be increased or decreased by the visitor, wherein by zooming in, decreasing the size of the geographic area covered by the full screen display, thus increasing the map display scale, the selected geographic area examined may be viewed in greater detail with respect to points of interest corresponding to the visitors search criteria, and wherein by zooming in, decreasing the size of the geographic area covered by the full screen display, thus increasing the map display scale, additional points of interest, corresponding to the visitor's search criteria, and clustered in any given screen surface area or within any given array and number of pixels, but, not previously visible at small scales in the said given screen surface area or by any given number of pixels, may be displayed, and once displayed, may, then, be moused-over, or otherwise visitor designated and queried for additional information.

In another aspect, an automated means is provided to tabulate and report-on-demand, visitor activity with respect to a given on-line application of the said business method.

In another aspect, the tabulated visitor activity comprises, concurrently or alternatively; the number of visitor access events on an area map, the number of map dot mouse-overs, the number of special offer mouse-overs, the number of visitor access events through an associated system for any given customer website, the number of reservations made through an associated system for any given advertiser, the number of reservations made through an associated system for all advertisers, the total value of reservations made through an associated system for any given advertiser, total value of all reservations made through an associated system for all advertisers.

In another aspect, the invention includes a method for providing internet-based advertising for one or more advertisers to one or more customers comprising the steps of presenting to each customer means to initiate an internet search for geographically located points that are of interest to said customer, said search being centered within a geographic area automatically chosen for, or manually selected by, said customer, simultaneously displaying results of the said search as icons superimposed on a map of the geographic area such that each icon represents a particular point of interest, and each icon depicts on the map the geographical location of the particular point of interest, presenting to the customer a Dynamic Billboard display window comprising data relevant to the particular point of interest represented by the icon when the customer mouses over or otherwise designates the icon, said dynamic display window comprising one of several optional Dynamic Billboards comprising text, video, graphics, or clickable links to web pages or sites concurrently, or alternatively, and presenting to the advertiser means to change any Dynamic Billboard or said windows in real time without intermediary action of or approval of any other party or entity, and wherein a means is provided by which the map display scale may be increased or decreased by the visitor, wherein by zooming in, decreasing the size of the geographic area covered by the full screen display, thus increasing the map display scale, the selected geographic area examined may be viewed in greater detail with respect to points of interest corresponding to the visitors search criteria, and wherein by zooming in, decreasing the size of the geographic area covered by the full screen display, thus increasing the map display scale, additional points of interest, corresponding to the visitor's search criteria, and clustered in any given screen surface area or within any given array and number of pixels, but, not previously visible at small scales in the said given screen surface area or by any given number of pixels, may be displayed, and once displayed, may, then, be moused-over, or otherwise visitor designated and queried for additional information, and wherein is provided an automated means to tabulate and report-on-demand visitor activity with respect to a given on-line application of the said business method, and wherein the tabulated visitor activity comprises, alternatively or concurrently; the number of visitor access events on an area map, the number of map dot mouse-overs, the number of special offer mouse-overs, the number of visitor access events through this system for any given customer website, the number of reservations made through an associated system for any given advertiser, the number of reservations made through an associated system for all advertisers, the total value of reservations made through an associated system for any given advertiser, total value of all reservations made through an associated system for all advertisers.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Looking at FIGS. 1 and 2, we see a flow chart illustrating available steps in exercise of the instant technology, including alternate progressions. Looking at FIGS. 2 though 6, we see a progression of computer screen displays (15, 25/25, 30, 42,52) in succeeding order that would result from the logical initiation and progression to conclusion of a search and initialization of the instant art offered by an internet advertising provider, said order of succession beginning with browser home page (15) and ending with Dynamic Billboard screen (52). The screen, (52) is composed by an advertiser. A search is initiated by a visitor, or potential customer.

Looking additionally at FIG. 2, we see a homepage screen (15) of a browser, the screen (15) having one or more boxes (18), whereby a geographical search area may be designated by the visitor to yield points of interest. It incorporates, as shown, a GO, or ENTER, button (22) which may be clicked to initiate a search. Generally, the points of interest will be businesses that provide products or services sought by the visitor.

Attending again to FIG. 2, we note the home page (15) of the instant art having one or a plurality of panels (18) having search filter selection boxes (35) offering the visitor access to various information such as how to use the instant art as well as means to interact with the instant art staff for such purposes as general communication, tech support, engaging the instant art for an advertiser, means to provide visitor feedback, means for patrons of an advertiser to enter comments regarding said advertiser, which comments may or may not be accessible, to visitors of the instant art, and/or sundry other purposes, the visitor and/or advertiser might find beneficial. Also, we note a map that additionally comprises a box (38) wherein the visitor may enter relevant location information calculated to yield points of interest to the visitor and a go, or enter button, (40) to initiate a search for said points of interest.

Now, we may readily appreciate that one or more of the search filter selection boxes (35) may contain a drop down box (18) to aid the visitor in the entry of terms in the location entry box (38) and/or to aid the visitor in refining his search. Additionally, we see that said homepage (15) comprises a map (45) depicting the current geographical location of the visitor as determined by any of sundry means well known in the art, in example, the IP address of the visitor, GPS data obtained from the visitor's internet interface device, or manually entered visitor data. The geographic limitations represented by this map (45) dictate the geographic bounds assigned to the given search results to be displayed.

Turning again to FIG. 2, we see a screen, (42) displaying results of such a search, the screen (42) having the map (45) with superimposed icons (47) representing physical locations of the points of interest to the visitor discovered by the search in the geographical area of interest to the visitor.

Further looking at FIG. 2, we see that the screen (42) may further comprise one or more buttons (49) which may comprise means to change the geographical area mapped, or zoom in or out on the displayed map (45), or any of sundry other functions the visitor might find beneficial. Further, we may understand that the screen, (42) may also comprise one or a plurality of boxes (82) offering any or all of sundry services and/or information provided by or pertaining to the particular advertiser. In example, said services and/or information may comprise special sales, special products available, special services available, or any others limited only by the capability and imagination of the advertiser. The box, or boxes, (82) may also comprise clickable, or mouse-over, otherwise designatable elements (84) by which the visitor may access web sites or other screens relevant to the advertiser. For presentation of or access to such box, or boxes, (82) the advertiser may or may not be charged a premium.

Figure 3:
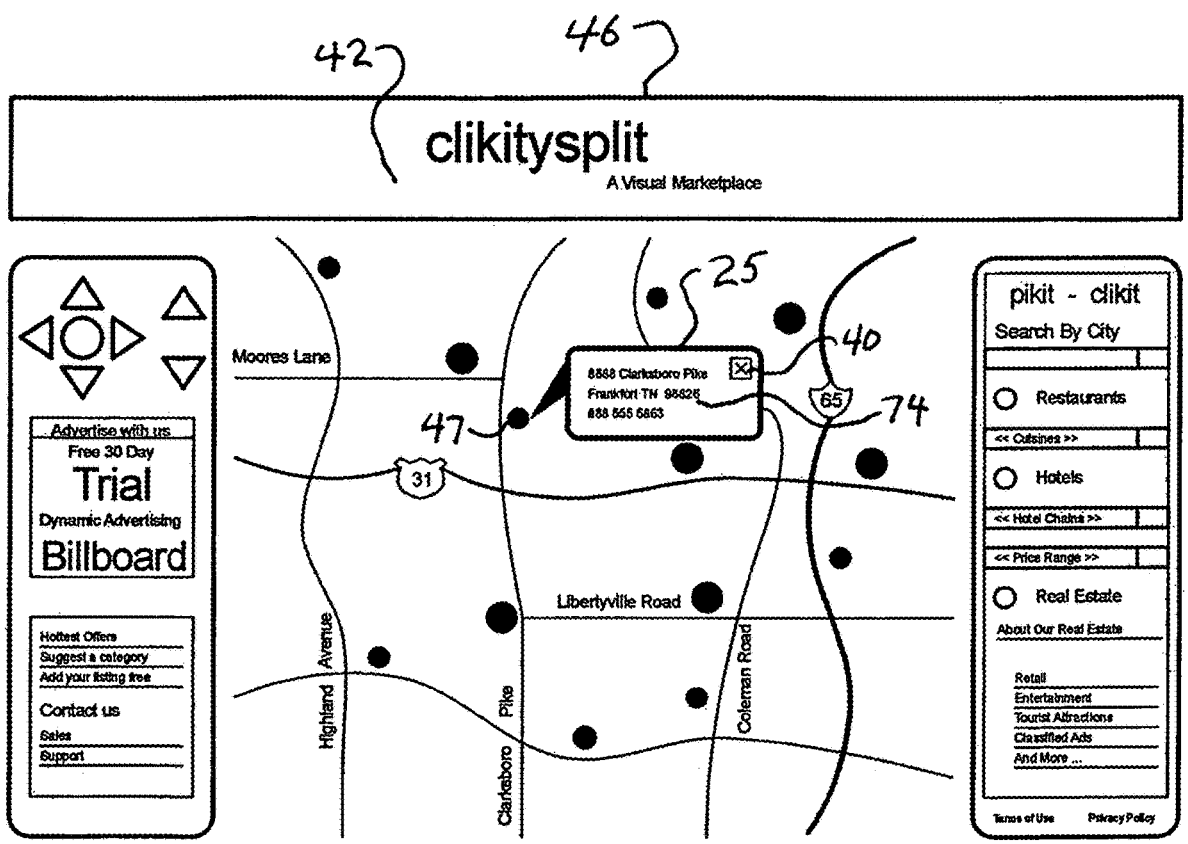

Looking at FIG. 3, we see the first screen (25), wherein is displayed a non subscribing advertiser pop-up display (25) and a go, or enter button (40) or other clickable radio-button hyperlink such as a line of text (74) that may comprise assertions that the instant art may more quickly and easily yield to the visitor his desired points of interest or other information, graphics, audio, video, or other data display means calculated to induce the visitor to further use the instant art.

Figure 4:
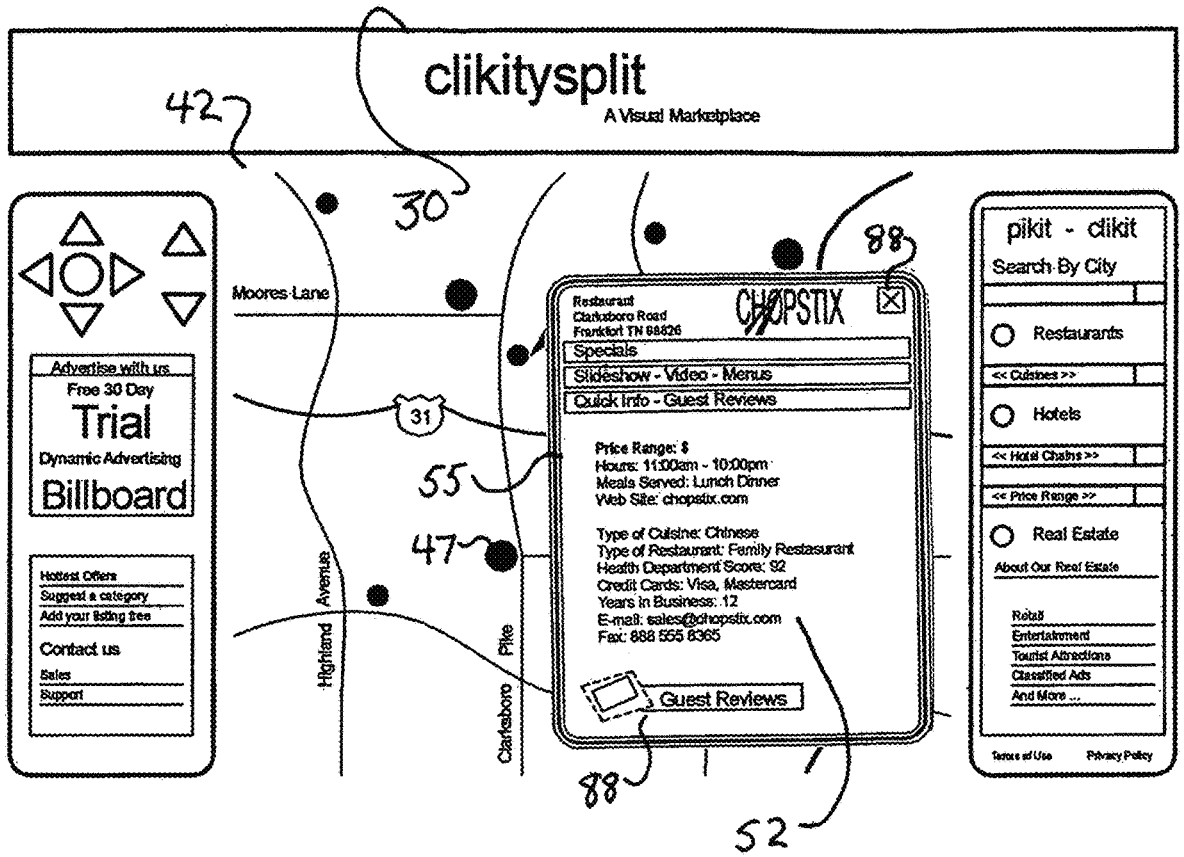

Turning attention to FIGS. 3 and 4, we may readily appreciate that when the visitor manipulates his computer mouse so as to cause a cursor to contact an icon (47), representing a paid advertising subscriber displayed on the screen (42) (that is, mouses over an icon) display of a Dynamic Billboard screen (55) will be accomplished, said Dynamic Billboard screen (55) being relevant to the particular point of interest represented by the icon. The Dynamic Billboard (52) comprises information from the customer created Dynamic Billboard screen (52), the Dynamic Billboards comprising text, graphics, video, and/or other visual presentation means well known in the art.

Figure 5:
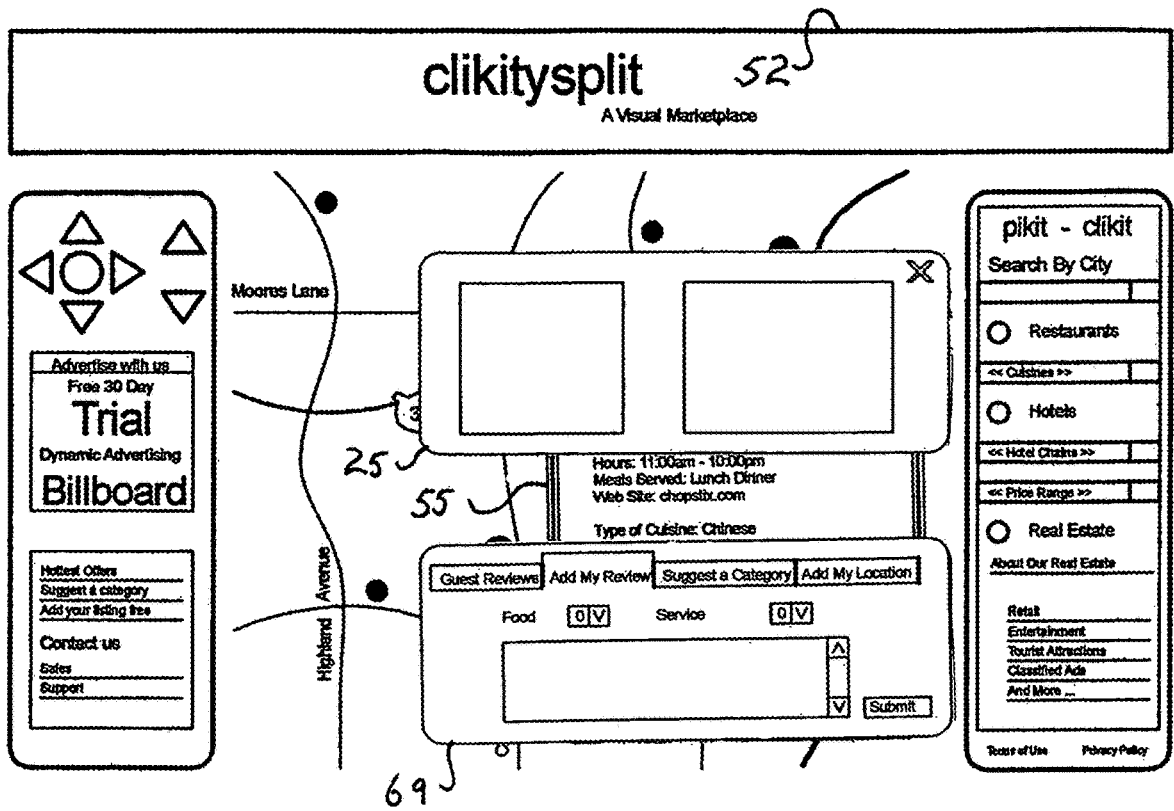

Also, referring to FIG. 3), we may readily appreciate that the Dynamic Billboard (55), or any elements displayed thereon, may comprise a clickable element (88) whereby the potential customer may further access the web site of the point of interest represented by the clickable element (88), (also see FIG. 5)) by mousing over an icon representing a non-subscribing advertiser activates a default information pop-up (25). Icons are colored or otherwise coded to differentiate those of paid advertiser subscribers.

Figure 7:
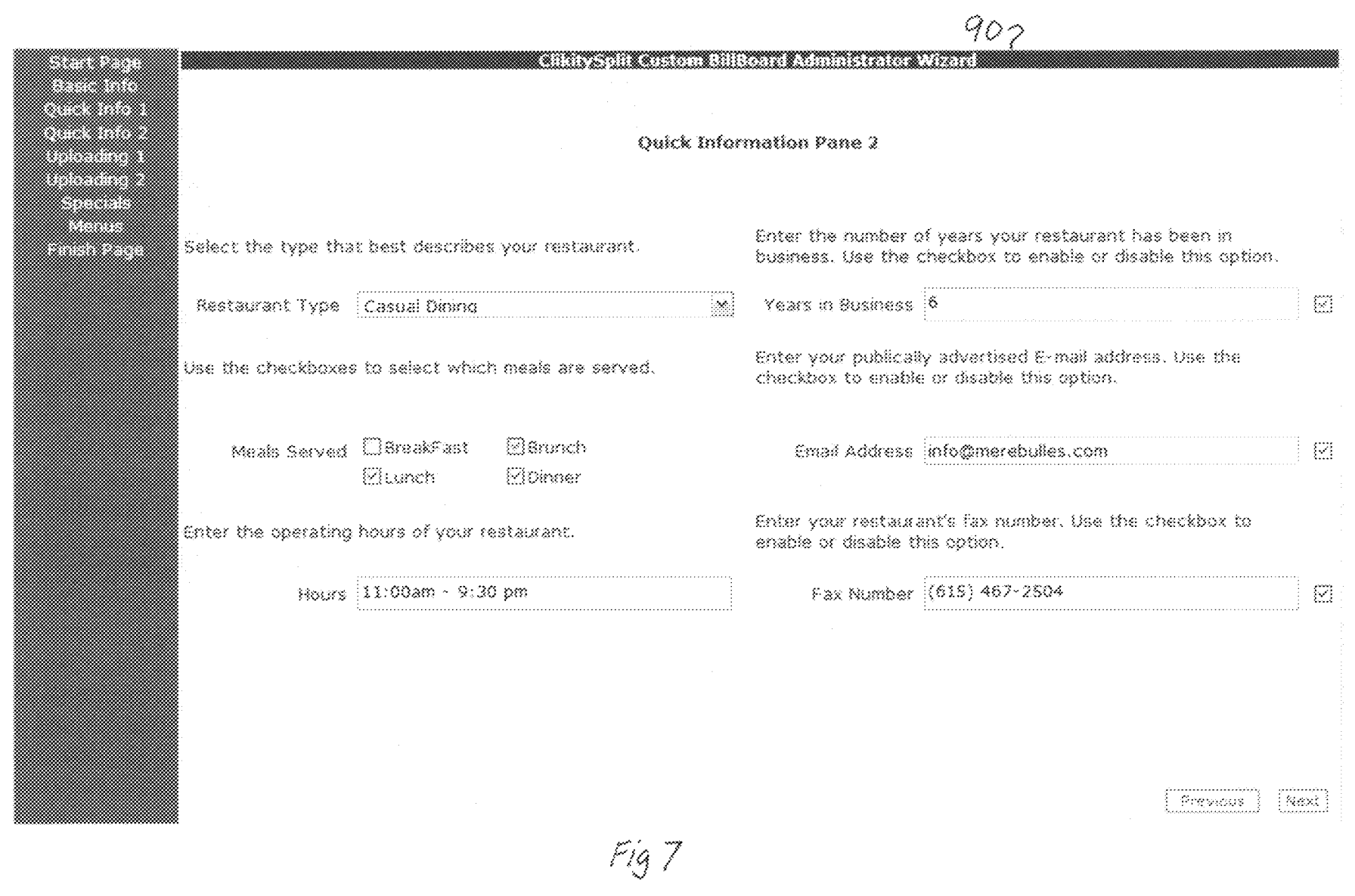

Means are also provided for a paid subscriber advertiser to interact with the provider staff or to execute certain tasks without intermediary action of or approval from said staff other than by means of separately accessible screens or pages. (See FIGS. 1.2, 7 and 8.) In example, an advertiser may have access to different web pages whereby he may communicate with the instant internet advertising provider and/or the staff of the same via which he may accomplish any intercourse required to maintain a mutually beneficial relationship between the advertiser and the provider of the instant art. (See FIGS. 6 through 8.) These may include, but not be limited to, a Dynamic Billboard editor (FIG. 7)), technical support, format, reformat or alteration of advertising, provision of statistical or demographical data regarding potential customers, such as business generated by the instant art provided advertising, or frequency of icon mouse-overs. The advertiser may gain said access by entering the web address of a secure customer access web page (69).

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method for communication between a marketer subscriber and a user via improved information update and display on a space-limited display device of the user, comprising:
    receiving search data from the device of the user corresponding to a request from the user for point-of-interest information for a geographic location, the search data including information about the geographic location and a point-of-interest category selected from a plurality of point-of-interest categories;
    sending a map control to the device of the user with the information about the geographic location and a request to transmit data to generate on the device of the user a visual map display of an area having geographic bounds including the geographic location;
    generating on a web server a point-of-interest dataset corresponding to the point-of-interest request, the point-of-interest dataset including results within the geographic bounds for each of the plurality of point-of-interest categories;
    transmitting instructions corresponding to points of interest in the selected category within the geographic bounds to the device of the user, the instructions being rendered by a processor on the device of the user to generate an overlay display as points of interest on the visual map display on the device of the user;
    selectively displaying to the user results for the selected category within the geographic bounds, wherein the geographic bounds are assigned to the results in the dataset to limit the displayed points of interest to those located within the geographic bounds;
    transmitting an enhanced display window including additional information of the subscriber to the device of the user for display to the user in response to user selection, wherein the overlaid display on the device of the user includes a map background and a map overlay, the map overlay including at least one point of interest associated with the additional information of the subscriber, thereby providing the additional information of the subscriber on the space-limited display device of the user without the user clicking through to other screens;
    receiving from the subscriber a request to change a content of the enhanced display window; and
    enabling the subscriber to exercise direct, real-time control over the content of the enhanced display window by, in response to receiving the request by the subscriber to change the content of the enhanced display window, immediately updating the content of the display window upon receipt from the subscriber of the request to change the content of the enhanced display window, such that a subsequent election on the device of the user to view the additional information of the subscriber results in the updated content being displayed on the device of the user.

2. The communication method of claim 1, further comprising:
    initially establishing and subsequently updating, by specialized software, the additional information of the subscriber.

3. The communication method of claim 1, further comprising:
    receiving from the user an identification of the point-of-interest category selected from the plurality of point-of-interest categories.

4. The communication method of claim 1, further comprising:
    establishing by default the point-of-interest category selected from the plurality of point-of-interest categories.

5. The communication method of claim 1, further comprising:
    establishing the geographic bounds based upon geographic boundaries of the map visually displayed on the device of the user.

6. The communication method of claim 1, further comprising:
    determining the geographic location based upon manual indication of the geographic location.

7. The communication method of claim 1, further comprising:
    determining the geographic location automatically using an IP address of a requesting browser or GPS locator data.

8. The communication method of claim 1, further comprising:
    transmitting to the device of the user points of interest within the geographic bounds within a different category selected from the plurality of point-of-interest categories.

9. The communication method of claim 1, further comprising:
    determining that the user has indicated that the user elects the option to view the additional information of the subscriber based upon the user mousing over the point of interest to which the additional information corresponds.

10. The communication method of claim 1, further comprising:
    determining that the user has indicated that the user elects the option to view the additional information of the subscriber based upon the user indicating the point of interest to which the additional information corresponds.

11. The communication method of claim 1, further comprising:
directing a map server to transmit the data to generate on the device of the user the visual map display of the area having geographic bounds including the geographic location.

12. The communication method of claim 11, the directing step comprising:
transmitting a map control to the device of the user, the map control communicating with the map server to request the data to generate on the device of the user the visual map display of the area having the geographic bounds including the geographic location.

13. The communication method of claim 11, the directing step comprising:
sending by the web server directly to the map server the request for the data to generate on the device of the user the visual map display of the geographic area including the geographic location.

14. The method of claim 1, the dataset including points of interest results for the geographic location, the method further comprising:
capturing statistical data about an establishment of the subscriber, which establishment falls within the geographic bounds within which the points of interest are located;
compiling the statistical information about the establishment with statistical information about other establishments; and
providing that statistical information to the subscriber as narrowcast analytics data.

15. The method of claim 1, further comprising:
capturing and retrieving narrowcast statistical and analytical information corresponding to the points of interest within the received geographic bounds from a location data store accessible to the server, wherein retrieving the information comprises retrieving information corresponding to all points of interest within the geographic location that are entered in the location data store; and
providing the narrowcast statistical and analytical information to the marketer subscriber.

16. The method of claim 1, the receiving search data step comprising:
receiving search data from the device of the user corresponding to selection of menu items on the device of the user alone, rather than textual entries.

17. The method of claim 16, wherein the menu items include the plurality of point-of-interest categories.

18. A method of providing information corresponding to a point of interest from a marketer subscriber to a user, said method comprising:
providing, via a communication network, a map control from a server to a client associated with the user;
receiving at the server, via the communication network, geographic bounds from the map control on the client;
retrieving information corresponding to points of interest within the received geographic bounds from a location data store accessible to the server;
applying the geographic bounds to the retrieved information to limit the information to points of interest within the geographic bounds;
providing, via the communication network, the limited information corresponding to the points of interest to the map control on the client associated with the user;
displaying to the user, via the map control, icons representing points of interest for which the limited information is received at the map control;
providing to the user an option to view a display window comprising text, video, graphics, or a clickable link to a web page, the display window corresponding to one of the icons displayed to the user;
displaying the display window to the user in response to the user electing the option to view the display window using the client associated with the user;
receiving at the server a request by the subscriber to change a content of the display window; and
changing the content of the display window in accordance with the request and upon receipt of the request and providing to the subscriber direct control over the content of the display window.

19. A method of gathering data corresponding to points of interest in a system for providing information from a marketer subscriber to a user, said method comprising:
receiving search data from a device of the user corresponding to a request from the user for point-of-interest information within select geographic bounds;
transmitting instructions corresponding to points of interest within the geographic bounds to the device of the user, the instructions being rendered by a processor on the device of the user to generate an overlay display as points of interest on a visual map display on the device of the user to:
selectively displaying to the user, results within the geographic bounds, wherein the geographic bounds are assigned to the results to limit the displayed points of interest to those located within the geographic bounds;
transmitting additional information of the subscriber to the device of the user for display to the user as an enhanced display window corresponding to a selected point of interest in response to the user electing on the device an option to view the additional information of the subscriber, the additional information in the enhanced display window including an offer;
capturing and retrieving at a server from a location data store, offer information corresponding to the selected point of interest within the geographic bounds corresponding to the map display, the information including a number of mouse-overs for the offer and a number of requests for the offer; and
providing the offer information to the marketer subscriber.

20. The method of claim 1, further comprising:
displaying to the user a zoom option that, in response to user input, displays to the user other points of interest in addition to the points of interest displayed on the visual map display on the device of the user, wherein data clusters corresponding to the points of interest are opened, graphically displayed, graphically de-clustered, examined and repeatedly further graphically de-clustered for increasingly detailed examination and increased information availability within the space-limited display.

* * * * *